Jan. 2, 1968  R. H. F. JEFFES  3,361,446

TELESCOPIC DRAW-BAR COUPLING

Filed May 31, 1966  2 Sheets-Sheet 1

INVENTOR:-
ROBERT HENRY FRANCIS
JEFFES

United States Patent Office 3,361,446
Patented Jan. 2, 1968

3,361,446
TELESCOPIC DRAW-BAR COUPLING
Robert H. F. Jeffes, Peaches Farm, Minchinhampton,
Stroud, Gloucestershire, England
Filed May 31, 1966, Ser. No. 553,835
Claims priority, application Great Britain, June 4, 1965,
24,036/65
2 Claims. (Cl. 280—478)

ABSTRACT OF THE DISCLOSURE

A telescopic draw-bar coupling particularly to be used for connecting an implement to a tractor. The telescopic inner and outer members of the coupling are connected one to the tractor and the other to the implement. The inner member has inner and outer end portions slidable and non-rotatable in the outer member and a neck between the end portions. A locking pin passes transversely of the members through a hole in the outer member and extends under the bias of a spring into a hole in the outer end portion of the inner member, when the coupling is fully retracted, and thus locks the members together. When the coupling is to be partly extended, the pin is withdrawn from the hole in the inner member and allowed to enter the annular space between the neck and the inside of the outer member. The completely withdrawal of the inner member is then stopped by the inner end portion thereof engaging the pin. To separate the members completely, the pin is withdrawn to remove it from the annular space to permit the inner end portion of the inner member to pass the pin.

When an implement is to be coupled to a tractor, by one or more of the couplings, each coupling is partly extended before connection, the locking pin being located in the annular space around the neck of the inner member. As the neck permits limited universal movement of the inner member with respect to the outer member, the connection of the implement to the tractor can be performed without manhandling the implement into exact alignment with the tractor. As the tractor is backed up to the implement, the coupling or couplings will gradually straighten and the tractor will become aligned with the implement. As soon as each coupling has become fully retracted, the locking pin thereof will enter the hole in the outer end of the inner member and lock the coupling.

---

The invention relates to a telescopic draw-bar coupling and is particularly, but not exclusively, concerned with such a coupling for connecting an agricultural tractor to an implement.

An object of the present invention is to provide a telescopic draw-bar coupling which can be extended to enable end connections to be effected, but which also permits relative movement of the members of the coupling laterally of the longitudinal axis thereof, when the members have been extended, thereby to assist the effecting of the end connections.

According to the present invention, a draw-bar coupling comprises a pair of telescopically slidable members, each having means arranged to be connected respectively to an attachment on one or other of two objects to be coupled together, the inner member having a neck formed between two end portions thereof and said end portions being a sliding fit within the outer member, a locking pin located in a transversely-extending hole in the outer member and spring means arranged to effect insertion of the locking pin through said hole and either into a second hole extending transversely through the outer end portion of the inner member and axially aligned with the hole in the outer member, when the coupling is unextended, or into the space between said neck and the inside of the outer member, when the coupling is extended, the neck permitting limited relative angular movement between the extended members, and the inner end portion of the inner member being engageable with said locking pin to prevent the complete withdrawal of the inner member from the outer member, unless the locking pin has been fully retracted, against the spring means, into the hole in the outer member.

In order to facilitate the aligning of the holes in the members when the coupling is unextended, the inner member may be prevented from turning in the outer member about the common longitudinal axis of the members. This may conveniently be accomplished by forming the outer member as a socket having a non-circular internal cross-section, the inner and outer end portions of the inner member being of complementary shape. Alternatively, the outer member may be in the form of a socket having a cylindrical bore, the inner and outer end portions of the inner member also being of cylindrical shape and being prevented by key means from turning in the socket.

One coupling in accordance with the invention will now be described by way of example with reference to the accompanying drawings, in which.

Figure 1:
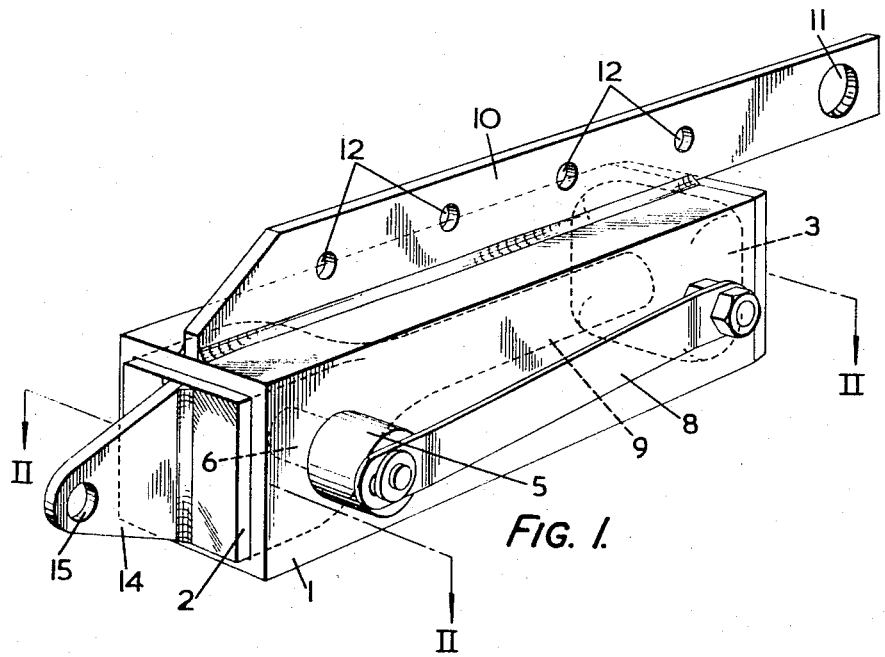
FIGURE 1 is a perspective view of the coupling when the members thereof are unextended.
Figure 2:
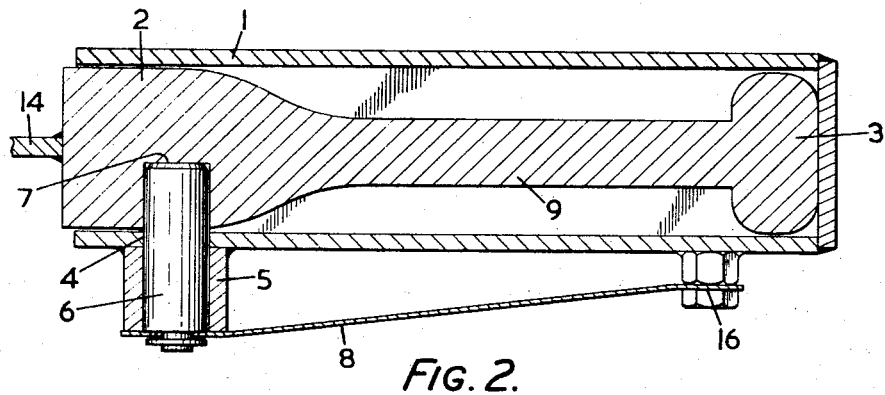
FIGURE 2 is a section on the plane indicated by lines II—II in FIGURE 1.

The coupling comprises an outer member in the form of a socket 1 of square internal cross-section in which is telescopically fitted an inner member, having inner and outer end portions 2 and 3 also of square cross-section and slidable freely but non-rotatably in the socket 1. The socket 1 has a transverse hole 4 therein in axial alignment with a bush 5 mounted on an outside wall of the socket. The bush 5 contains a locking pin 6. The outer end portion 2 of the inner member also has a hole 7 therein into which the pin 6 is inserted, when the holes 4 and 7 are aligned one with the other and the members are in their unextended positions, as shown in FIGURES 1 and 2. The socket 1 carries on said outside wall at 16 a cantilever leaf spring 8, the latter carrying the locking pin 6 and biasing it into the position shown in FIGURES 1 and 2 in which it extends through the hole 4 into the hole 7, thereby preventing the members from becoming telescopically extended until the locking pin 6 has been withdrawn from the hole 7 by the operator against the bias of the spring 8. When the members are locked in this position, they are also prevented from moving laterally relatively to one another, by the outer end portion 2 which is then engaged in the socket 1.

Figure 3:
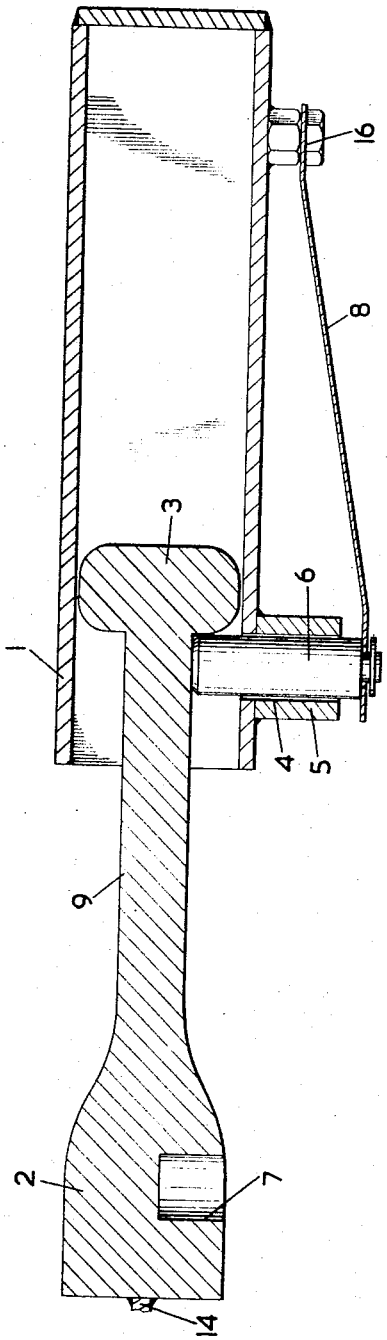
FIGURE 3 is a section similar to FIGURE 2, but showing the members of the coupling fully extended.

Between the square inner and outer end portions 2 and 3, the inner member is of cylindrical cross-section of reduced diameter forming a neck 9. This permits the inner member to move angularly relatively to the socket 1 in all directions when the members are partly extended or fully extended, as shown in FIGURE 3. The extent of the angular movement of the inner member with respect to the socket is only limited by the neck 9 bearing against the inside of the mouth of the socket 1, the end peripheral edges of the outer end portion 3 being rounded to permit said angular movement.

The complete withdrawal of the inner member from the socket is prevented by the locking pin 6 becoming engaged by the inner end portion 3, as shown in FIGURE 3. The inner member may however be withdrawn completely, if the operator first so retracts the locking pin 6, against the bias of the spring 8, that the end of the pin does not extend through the hole 4.

The same locking pin 6 thus acts to lock the members together in their unextended positions, as shown in FIGURES 1 and 2; it also acts to limit the distance by which they can be extended, as shown in FIGURE 3, and it is readily retractable to permit complete separation of the members.

The socket 1 has a bar 10 welded along one wall thereof, the bar having a part-spherical seating hole for receiving a ball of a ball-and-socket joint, whereby the socket is attached to a tractor, and several alternative holes 12 to which a link of the lift mechanism of the tractor is attached. Although the socket can readily be detached from the tractor, it is practicable to keep it in position and instead to uncouple the inner member from the implement. Alternatively, the socket may be welded directly to a member of the lift mechanism of the tractor.

The outer end face of the inner member has a plate 14 welded thereto, the plate 14 having a part-spherical seating hole 15 therein into which a ball member attached to the implement can be inserted. Instead of the hole 15 other equivalent means such as a self-locking hook, may be employed.

The coupling is connected between a tractor and an implement in the following way: the tractor to which the socket 1 has already been attached is moved towards the implement until it is within coupling distance. The locking pin 6 is withdrawn from the hole 7 in the inner member and the latter is withdrawn from the socket by a sufficient distance or the limiting distance when the locking pin 6 has become engaged by the end portion 3. The inner member can then be moved angularly relatively to the socket in any desired direction until the plate 14 can be attached to the implement. If necessary, the tractor or the implement may be moved, but the provision of the neck 9 is intended to avoid the need for such movement. After the plate 14 has been attached to the implement, the tractor is backed towards the implement until the coupling straightens and the latter is retracted until the holes 7 and 4 have become aligned, thereby permitting the locking pin 6 to enter them, thereby locking the coupling. Alternatively the socket could be attached to the implement and the inner member to the tractor; but appropriate attachment means would have to be provided.

If preferred, the members could be attached, before assembling the coupling, to the tractor and the implement respectively.

Where two or more attachment points are provided on the tractor and the implement, a corresponding number of couplings provided by this invention may be used. The members of the couplings can each take up different angular positions according to the disposition of the implement relatively to the tractor. As the tractor is backed towards the implement, the latter will be aligned by the couplings and each coupling will be individually returned until they have all become locked in their unextended positions.

Although the invention is particularly intended to be applied to a coupling between a tractor and an implement, it may be applied to any coupling where alignment between the objects to be connected is difficult.

Although the coupling that has been illustrated has a socket of square cross-section, it may be of any other non-circular cross-section, the inner and outer ends of the inner member being of complementary shape. Alternatively the socket and the inner and outer ends of the inner member may be circular; but in that case a key and key-way would be provided to prevent rotation of the inner member in the socket.

What I claim as my invention and desire to secure by Letters Patent of the United States is:

1. A draw-bar coupling comprising a pair of telescopically slidable members, each having means to be connected respectively to an attachment on one or other of two objects to be coupled together, the inner member having a neck formed between two end portions thereof and said end portions being a sliding fit within the outer member, a locking pin located in a transversely-extending hole in the outer member and spring means arranged to effect insertion of the locking pin through said hole, wherein the improvement comprises the provision of a second hole extending transversely through the outer end portion of the inner member and axially aligned with the hole in the outer member, when the coupling is unextended, the locking pin being alternatively insertable into said second hole and into the annular space between said neck and the inside of the outer member by withdrawing the outer end portion of the inner member from the outer member, the neck when the coupling is extended, permitting limited relative angular movement between the extended members and the inner end portion of the inner member being engageable with said locking pin to prevent the complete withdrawal of the inner member from the outer member, unless the locking pin has been fully retracted, against the spring means, into the hole in the outer member.

2. A coupling as claimed in claim 1 in which the outer member is in the form of a socket having a non-circular internal cross-section, the inner and outer end portions of the inner member being of complementary shape.

References Cited

UNITED STATES PATENTS

| 1,328,654 | 1/1920 | Filkins | 280—493 X |
| 2,826,431 | 3/1958 | Able et al. | 280—493 X |
| 3,116,076 | 12/1963 | Zingsheim | 280—494 X |
| 2,845,281 | 7/1958 | Holder et al. | 280—478 |
| 3,019,032 | 1/1962 | Oehler et al. | 280—478 |

FOREIGN PATENTS 839,387   6/1960   Great Britain.

LEO FRIAGLIA, *Primary Examiner.*

BENJAMIN HERSH, *Examiner.*

C. C. PARSONS, *Assistant Examiner.*